(12) United States Patent
Wiman

(10) Patent No.: US 6,786,682 B1
(45) Date of Patent: Sep. 7, 2004

(54) CUTTING INSERT FOR TURNING

(75) Inventor: Jörgen Wiman, Sandviken (SE)

(73) Assignee: Sandvik Aktiebolag, Sandviken (SE)

( * ) Notice: Subject to any disclaimer, the term of this patent is extended or adjusted under 35 U.S.C. 154(b) by 0 days.

(21) Appl. No.: 09/913,508

(22) PCT Filed: Oct. 2, 2000

(86) PCT No.: PCT/SE00/00262

§ 371 (c)(1),
(2), (4) Date: Oct. 17, 2001

(87) PCT Pub. No.: WO00/47405

PCT Pub. Date: Aug. 17, 2000

(30) Foreign Application Priority Data

Feb. 15, 1999 (SE) .............................................. 9900528

(51) Int. Cl.[7] .......................... B23P 15/28; B26D 1/00; B26D 3/00
(52) U.S. Cl. ...................................... 407/114; 407/116
(58) Field of Search ................................ 407/116, 114, 407/113, 115

(56) References Cited

U.S. PATENT DOCUMENTS

| 4,318,645 | A | * | 3/1982 | McCreery ................... 407/114 |
| 4,629,371 | A | * | 12/1986 | Maeda et al. ................ 407/114 |
| 5,116,167 | A | * | 5/1992 | Niebauer ..................... 407/114 |
| 5,246,315 | A | * | 9/1993 | Hansson et al. ............. 407/114 |
| 5,421,679 | A | * | 6/1995 | Pantzar et al. .............. 407/114 |
| 5,725,334 | A | * | 3/1998 | Paya .......................... 407/117 |
| 5,772,366 | A | * | 6/1998 | Wiman et al. .............. 407/119 |
| 5,897,272 | A | * | 4/1999 | Wiman et al. .............. 407/114 |
| 5,904,450 | A | * | 5/1999 | Satran et al. ................ 407/113 |
| 6,146,065 | A |   | 11/2000 | Isaksson |
| 6,217,263 | B1 | * | 4/2001 | Wiman et al. .............. 407/114 |

FOREIGN PATENT DOCUMENTS

SE 0 962 272 A1 * 4/1999
SU 1798045 A * 12/1993

* cited by examiner

Primary Examiner—A. L. Wellington
Assistant Examiner—Brian Walsh
(74) Attorney, Agent, or Firm—Burns, Doane, Swecker & Mathis, L.L.P

(57) ABSTRACT

The cutting plate in the form of a polyhedron comprises a front surface (1) and a rear surface (2) at an angle to it, cutting edges (3), strengthening facet (4), inclined to the plane of the cutting edges, and a swarf-breaking groove (5). The strengthening facet is in the form of three sectors, the angle of inclination of which to be the plane of the cutting edges is determined from specified expressions. The third sector of the strengthening facet is wider than the first two sectors.

5 Claims, 2 Drawing Sheets

CUTTING INSERT FOR TURNING

BACKGROUND OF THE INVENTION

The present invention relates to an indexable insert for turning which cutting insert has a polygonal basic form including an upper surface, and a bottom surface. The top and bottom surfaces are interconnected by side surfaces, wherein at least a part of the intersection lines between the side surfaces and the upper surface forms at least one main cutting edge, a secondary cutting edge and a curved corner cutting edge therebetween.

For copy turning nowadays, to a large extent, indexable inserts are used with nose point angles below 60°, wherein an ordinary value of the nose point angles is 55°, which enables application of the cutting inserts within a broad range. On the market nowadays a number of different types of indexable inserts with 55° nose point angle are found, among which types rhomboidic, rhombic and regular triangular indexable inserts can be mentioned.

In copy turning the following properties regarding feature and economy are desirable:

1) Good chip control, i.e. favourable chip guidance and chip breaking.
2) No movement of the cutting insert under impact of cutting forces.

When copy turning inwards in certain materials or in slender work pieces and also in usage on unsteady machines and in internal metal working, low cutting forces and preferably a positive chip angle on the copying insert are also desirable. Simultaneously there is a demand in modern machines that the copy turning insert to be used will be able to give the best possible surface finish of the machined surface. Sometimes the surface finish can be improved by using higher cutting speed and neutral or positive rake angles.

OBJECTS AND SUMMARY OF THE INVENTION

It is a first purpose of the invention to achieve a new and improved indexable insert for copy turning having a new type of wiper edge in the corner region which enables attainment of improved surface finish of the machined surface.

It is a second purpose to achieve an insert with a rake face in the corner area that brings about a favourable influence on the cutting force and the tool wear.

It is a third purpose to achieve an insert that is modified such that it enables increased feed whilst maintaining good surface finish.

The present invention relates to an indexible cutting insert having a polygonal shape and including an upper surface, a lower surface, and an edge surface structure interconnecting the upper and lower surfaces. An intersection between the edge surface structure and the top surface forms: a main cutting edge, a secondary cutting edge, and a curved corner region disposed between the main and secondary cutting edges. The corner region includes a radial edge and a corner edge of mutually different radii of curvature. The radial edge and the secondary cutting edge are disposed on a first side of a bisector of the corner region, The corner edge and the main cutting edge are located on a second side of the bisector. A radius of curvature of the radial edge is at least five times larger than a radius of curvature of the curved edge. The top surface includes an edge-reinforcing land extending along the radial edge and the curved edge. A portion of the land extending along the radial edge being of smaller width than a portion of the land extending along the curved edge.

BRIEF DESCRIPTION OF THE DRAWINGS

The invention will be described in more detail in the following with reference to the enclosed drawings, wherefrom the features of the invention will become apparent.

DETAILED DESCRIPTION OF PREFERRED EMBODIMENT OF THE INVENTION

Figure 1:
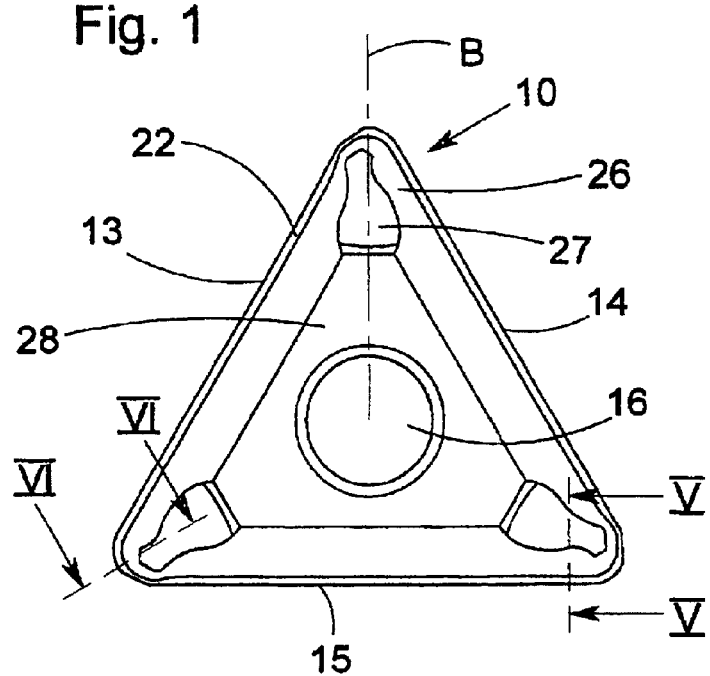
FIG. 1 is a plan view of a portion of an indexable insert according to the invention.
Figure 2:
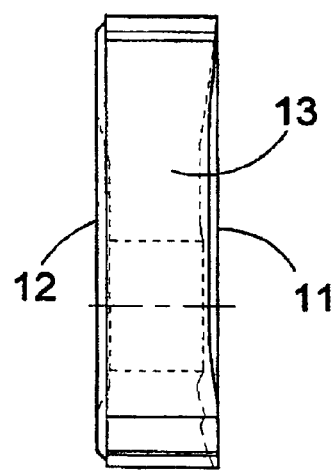
FIG. 2 is a side view of the cutting insert in FIG. 1.
Figure 3:
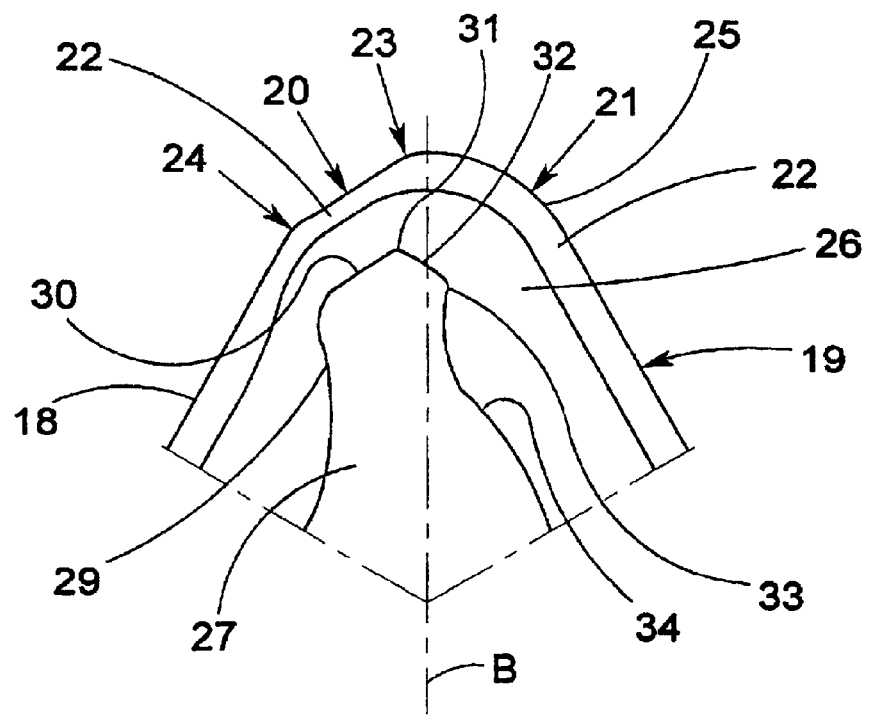
FIG. 3 is an enlarged detailed view of the corner of an insert according to FIGS. 1–2.
Figure 4:
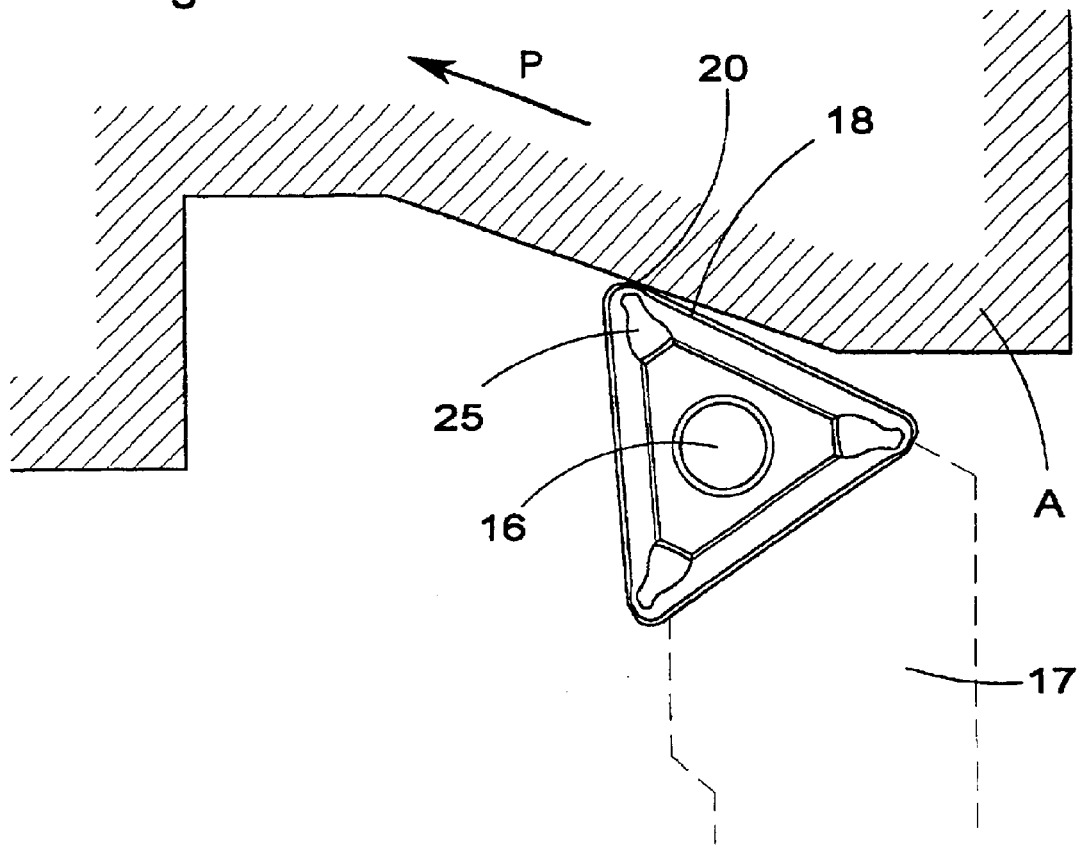
FIG. 4 is a view showing a tool with the cutting insert of FIGS. 1–3 during copy turning inwards of a work piece.
Figure 5:
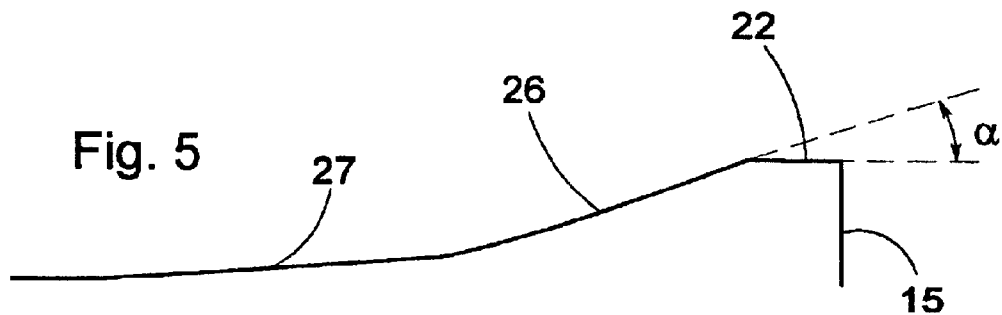
FIG. 5 shows a sectional view along the line V—V in FIG. 1.
Figure 6:
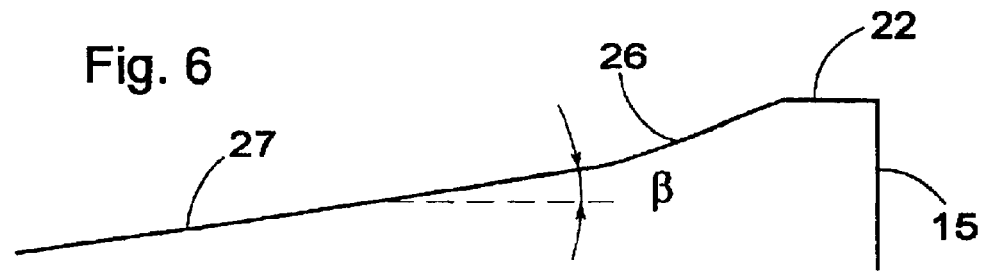
FIG. 6 is a sectional view along the line VI—VI in FIG. 1.

FIGS. 1–3 show a cutting insert 10 for copying turning according to the invention with triangular basic form. The cutting insert is generally made of cemented carbide but can also be made of other ceramic materials. The insert comprises flat top and bottom surfaces 11 and 12, which are mutually parallel and which form a right angle with the edge surfaces which are designated 13, 14 and 15 and interconnected by curved corner portions. In the embodiment shown in FIGS. 1–3 each of the edge surfaces is oriented in a plane perpendicular to the planes that include the flat surfaces 11 and 12. The insert additionally includes a plurality of cutting edges 18, 19 which provide intersections between the edge surfaces 13, 14, 15 and the top surface 11. The insert can alternatively have positive basic shape wherein the edge surfaces intersect with the top surface at an acute angle. The insert has a central hole 16 for the receipt of a pin or a centre screw (not shown) for the clamping of the insert into a belonging tool holder 17 (FIG. 4).

In FIG. 3 the edge [surface extending towards an acute-angled corner are designated 13 and 14, with the embodiment shown in FIG. 1 the edge] 18 represents a secondary cutting edge and the edge 19 represents a main cutting edge between which there is an asymmetric curved corner region including a radial edge 20 on one side of the bisector B intended to serve as a wiper edge and on opposite side of said bisector there is a corner edge 21 adjacent to the main cutting edge 19. It is to be understood that the insert must have such inclination that a clearance angle is obtained at the main and secondary cutting edges 18, 19 and at the corner region therebetween. This will enable the edge portion 20 to be used as an edge for inwards copying such that when facing at for example 90° a large cut can be taken while the length of the edges 18 need not be specifically great. The insert is provided at all cutting edge portions [provided] with a land 22 which extends all around the insert whilst oriented substantially perpendicular towards the edge surface 13, 14, 15.

According to the invention the radial edge 20 is provided with a [size of] radius that is at least five times larger than the size valid for the corner edge 21 located on the opposite side of said bisector B, said corner edge being a transition to the main cutting edge 19. A further characteristic feature is that the main cutting edge 19 extends in a longitudinal direction such that it includes an angle of 80–135° together with radial edge 20.

The transition between the primary radial edge 20 and the corner edge 21 is in the form of a secondary radial edge 23, the size of which ought to have a radius less than that of the radial edge 24 that represents a transition between the primary radial edge 20 and the secondary cutting edge 18. The relation should preferably be such that the size of the radius of radial edge 23 is about half the size of the radius of radial edge 24 located next to the secondary edge 18. At the same time, a transition radial edge 25 ought to be provided between the corner edge 21 and the main cutting edge 19, the radius of which ought to be of same size as the size of the radius of radial edge 24 located next to the secondary edge 18. As regards the width of the land 22 along radial edge 20 and along the remainder of the insert, it has been found suitable to select the width of the portion of said land 22 that extends along radial edge 20 such that it amounts to 50–70% of the width of the portion of the land 22 that extends along the corner cutting edge 21.

A sloping surface or downwards inclined surface 26 extends from the inner limiting edge of each land 22 and extends into a secondary sloping surface 27 which is located at the corner area. This secondary sloping surface 27 extends into a planar central floor surface 28 of triangular basic shape [whilst] while oriented plane parallel with the bottom face 12 of the insert. The angle of inclination a of said sloping surface 26 ought to be in the range of 10–30° whereas the angle of inclination of the secondary sloping surface 27 ought to be 0–15°.

Each land 22 is planar and includes a raised land area, which in a direction away from the corner area extends into an inclined land area. A characteristic feature of the invention is that said land area 22 includes an area 22' with smaller width along the radial edge 20 which then successively appears with larger width which is uniform both along the corner cutting edge 21 as well as along the entire main cutting edge 19. At the same time as this brings about a purposeful enforcement of the cutting edge, this simultaneously enables reducing the contact between the chips and the insert's surface such that the crater wear effect can be timely deferred.

In order to furthermore improve chipbreaking and deflection of the chip obtained during turning and copying, a chip former is provided in the corner region. This chipformer is provided by the secondary sloping surface or plateau 27 that is depressed in relation to the edge portions, the confining side surfaces of which converge towards the corner with an asymmetric configuration in relation to the bisector. More specifically the shape is such that an essentially sine wave-shaped side edge 29 located on same side of the bisector B as the primary radial edge 20 gets a termination in the form of an inclined primary edge 30. That edge 30 extends parallel with the radial edge 20 and then provides an obtuse angled corner 31 and then extends into a secondary edge 32 in the opposite direction whereby said bisector B intersects said latter edge approximately in the middle thereof. The last mentioned secondary edge 32 provides in its turn an obtuse angled corner 33 together with the forward termination of another mainly sine wave-shaped side edge 34 which represents a side confining edge of the plateau 27.

Thanks to the above defined radial differentiation in the corner region of the insert a surprisingly good surface smoothness of the machined surface has been achieved in comparison with a similar insert of constant corner radius, and the insert has additionally been found less sensible to how the setting angle is provided compared with a corresponding insert with a straight wiper edge. Due to the above optimized shape of the chipformer in combination with the shape of said land 22 it has simultaneously been possible to increase the feed by 20–100% whilst maintaining the profile depth of the generated surface.

In FIG. 4 it is shown how the illustrated embodiment of the insert is used for copying inwards with the insert clamped into an associated toolholder 17 whereby the direction of machining is designated P on the workpiece A.

In order to achieve optimized chip control the radii of the various radial edges should lie in the following intervals:

20: 5–30 mm, preferably 10–20 mm
21: 0.2–3.2 mm, preferably 0.4–1.6 mm
23: 0.2–1.6 mm, preferably 0.4–1.2 mm
24: 0.6–2.4 mm, preferably 0.8–1.6 mm
25: 16–30 mm, preferably 5–20 mm

What is claimed is:

1. An indexible cutting insert having a polygonal shape and including an upper surface, a lower surface, and an edge surface structure interconnecting the upper and lower surfaces; an intersection between the edge surface structure and the top surface forming: a main cutting edge, a secondary cutting edge, and a curved corner region disposed between the main and secondary cutting edges; the corner region including a radial edge and a corner edge of mutually different radii of curvature, wherein the radial edge and the secondary cutting edge are disposed on a first side of a bisector of the corner region, and the corner edge and the main cutting edge are located on a second side of the bisector; a radius of curvature of the radial edge being at least five times larger than a radius of curvature of the corner edge; the upper surface including an edge-reinforcing land extending along the radial edge and the corner edge, a portion of the land extending along the radial edge being of smaller width than a portion of the land extending along the corner edge; wherein the land further includes a portion extending along the secondary cutting edge and being of the same width as the portion of the land extending along the corner edge.

2. An indexible cutting insert having a polygonal shape and including an upper surface, a lower surface, and an edge surface structure interconnecting the upper and lower surfaces; an intersection between the edge surface structure and the top surface forming: a main cutting edge, a secondary cutting edge, and a curved corner region disposed between the main and secondary cutting edges; the corner region including a radial edge and a corner edge of mutually different radii of curvature, wherein the radial edge and the secondary cutting edge are disposed on a first side of a bisector of the corner region, and the corner edge and the main cutting edge are located on a second side of the bisector; a radius of curvature of the radial edge being at least five times larger than a radius of curvature of the corner edge; the upper surface including an edge-reinforcing land extending along the radial edge and the corner edge, a portion of the land extending along the radial edge being of smaller width than a portion of the land extending along the corner edge; wherein the width of the land portion extending along the radial edge is 50–70% of the width of the land portion extending along the corner edge.

3. An indexible cutting insert having a polygonal shape and including an upper surface, a lower surface, and an edge surface structure interconnecting the upper and lower surfaces; an intersection between the edge surface structure and the top surface forming: a main cutting edge, a secondary cutting edge, and a curved corner region disposed between the main and secondary cutting edges; the corner region including a radial edge and a corner edge of mutually different radii of curvature, wherein the radial edge and the secondary cutting edge are disposed on a first side of a bisector of the corner region, and the corner edge and the main cutting edge are located on a second side of the bisector; a radius of curvature of the radial edge being at least five times larger than a radius of curvature of the corner edge; the upper surface including an edge-reinforcing land extending along the radial edge and the corner edge, a portion of the land extending along the radial edge being of smaller width than a portion of the land extending along the corner edge; wherein the corner region includes a planar inclined surface that is recessed in relation to the radial edge and the corner edge, the planar inclined surface including generally sine-wave-shaped edge portions disposed on opposite sides of the bisector and generally converging outwardly away from a center of the insert; wherein the planar inclined surface further includes a substantially straight primary edge portion extending substantially parallel to the radial edge and situated on the same side of the corner bisector as the radial edge; wherein the planar inclined surface further includes a straight secondary edge portion intersected by the corner bisector and intersecting the primary edge portion to define an obtuse angle therewith.

4. The insert according to claim 3, wherein the bisector intersects the secondary edge portion substantially at a midpoint thereof.

5. An indexible cutting insert having a polygonal shape and including an upper surface, a lower surface, and an edge surface structure interconnecting the upper and lower surfaces; an intersection between the edge surface structure and the top surface forming: a main cutting edge, a secondary cutting edge, and a curved corner region disposed between the main and secondary cutting edges; the corner region including a radial edge and a corner edge of mutually different radii of curvature, wherein the radial edge and the secondary cutting edge are disposed on a first side of a bisector of the corner region, and the corner edge and the main cutting edge are located on a second side of the bisector; a radius of curvature of the radial edge being at least five times larger than a radius of curvature of the corner edge; the upper surface including an edge-reinforcing land extending from and along the radial edge and the corner edge, a portion of the land extending along the radial edge being of smaller width than a portion of the land extending along the corner edge; the upper surface further including a first downwardly sloping portion extending from the land and extending to a central floor portion of the upper surface; and a chip former depression formed in the sloping portion adjacent the corner region of the insert and spaced inwardly from the land, the chip breaker including a second downwardly sloping portion, wherein an angle of inclination of the first sloping portion being greater than an angle of inclination of the-second sloping portion, wherein the width of the land portion extending along the radial edge is 50–70% of the width of the land portion extending along the corner edge.

* * * * *